United States Patent [19]

Kaltbeitzel et al.

[11] Patent Number: 4,881,229
[45] Date of Patent: Nov. 14, 1989

[54] TEST CIRCUIT ARRANGEMENT FOR A COMMUNICATION NETWORK AND TEST METHOD USING SAME

[75] Inventors: Gunter Kaltbeitzel, Schwieberdingen; Michael Klein, Ruckersdorf; Martin Renner, Mettmann; Joachim Wolk, Besigheim, all of Fed. Rep. of Germany

[73] Assignee: Alcatel, N.V., Amsterdam, Netherlands

[21] Appl. No.: 111,935

[22] Filed: Oct. 21, 1987

[30] Foreign Application Priority Data

Oct. 25, 1986 [DE] Fed. Rep. of Germany ....... 3636427

[51] Int. Cl.$^4$ .............................................. G05F 11/02
[52] U.S. Cl. .................................... 371/20.4; 371/25.1
[58] Field of Search ................... 371/3, 25, 22, 27, 15; 364/200, 900, 579

[56] References Cited

U.S. PATENT DOCUMENTS

| | | | |
|---|---|---|---|
| 4,538,269 | 8/1985 | Briscoe | 371/22 |
| 4,654,851 | 3/1987 | Busby | 371/27 |
| 4,669,081 | 5/1987 | Mathews | 371/3 |
| 4,672,610 | 6/1987 | Salick | 371/27 |
| 4,686,628 | 8/1987 | Lee | 371/25 |
| 4,754,215 | 6/1988 | Kawai | 371/27 |

FOREIGN PATENT DOCUMENTS 0123243 10/1984 European Pat. Off. .
3331403 3/1985 Fed. Rep. of Germany .

Primary Examiner—Michael R. Fleming
Attorney, Agent, or Firm—Christie, Parker & Hale

[57] ABSTRACT

A built-in test-signal generator (TG) and a built-in error-detection circuit (PE) independent of the test-signal generator are provided in a novel circuit arrangement. In response to an external stimulus, a signal path can be opened at a given point, and the signal from the test-signal generator (TG) can be injected. The signal taken from another, likewise externally selectable point of the signal path is checked in the error-detection circuit (PE); the result is fed out. Such a circuit arrangement is used to advantage where many like circuit arrangements are united in a broadband switching network consisting of a plurality of broadband switching modules. Since the test-signal generators and the error-detection circuits are independent of each other, systems tests can be performed without having to form any additional testing paths. Such a circuit arrangement also facilitates the testing of large-scale-integrated circuits already on the wafer, because no high-frequency test signals have to be applied and taken off.

10 Claims, 2 Drawing Sheets

TEST CIRCUIT ARRANGEMENT FOR A COMMUNICATION NETWORK AND TEST METHOD USING SAME

TECHNICAL FIELD

The present invention relates to a circuit arrangement including a test-signal generator and an error-detection circuit, to a communications network including such a circuit arrangement, and to a method of testing such a communications network.

BACKGROUND ART

A circuit arrangement is disclosed in commonly assigned published patent Publication 0 123 243 A2 of the European Patent Office (corresponding to U.S. Pat. No. 4,538,269) in which it is possible to inject a test signal from outside via a signal input and the normal signal path. This test signal is then taken off directly behind the signal input and can be reinjected into the signal path at another point via selecting multiplexers, with a portion of the signal path being bypassed. If such an arrangement is to be tested at regular intervals during operation, it must be either regularly removed and connected to a measuring setup, as is customary in prior art telephone switching systems, or connected to a measuring setup via existing signal paths. On the one hand, this necessitates two additional connections from and to the measuring setup, which represent an additional traffic load, and on the other hand, errors on such additional paths enter fully into the error measurement. Furthermore, only few tests can be made simultaneously and long-term measurements are therefore virtually impossible.

From DE-OS 33 31 403 it is known to build complete self-test circuitry into electronic equipment which tests the equipment on request and makes the results of the test accessible. In principle, it is possible, e.g., in a telephone exchange, to equip all or a great number of assemblies with such self-test circuitry. In the case of large-scale-integrated assemblies, the additional expense would probably not be altogether prohibitive. The necessary exchange of information with the environment would also be acceptable, because it would only be necessary to initiate the test and later interrogate the testing device for the result. For tests covering two or more assemblies, however, a corresponding number of such self-test circuits are necessary.

DISCLOSURE OF INVENTION

The present invention remedies this shortcoming by providing a circuit which includes a built-in test-signal generator and a built-in error-detection circuit which is independent of the test-signal generator. In response to an external stimulus, a signal path can be opened at a given point, and the signal from the test-signal generator can be injected at that point. The signal taken from another, likewise externally selectable point of the signal path is checked in the error-detection circuit; the result is fed out.

Such a circuit arrangement is used to advantage where many like circuit arrangements are united in a major communications network. The invention may be advantageously used in a broadband switching network consisting of a plurality of broadband switching modules. Since the test-signal generators and the error-detection circuits are independent of each other, systems tests can be performed without having to form any additional testing paths.

Such a circuit arrangement also facilitates the testing of large-scale-integrated circuits already on the wafer, because no high-frequency test signals have to be applied and/or taken off.

BRIEF DESCRIPTION OF DRAWINGS

Embodiments of the invention will now be explained in detail with reference to the accompanying drawings, in which.

BEST MODE FOR CARRYING OUT THE INVENTION

First, the basic construction of a circuit in accordance with the invention will be described with the aid of FIG. 1. The figure shows part of a broadband switching module which can selectively connect any of 16 inlets E1 through E16 to any of 16 outlets A1 through A16 by means of a switching matrix K. The switching matrix K is controlled by a decode and control logic 6 over an internal control-data bus Stb. The decode and control logic 6 is connected to external control devices by an external control-data bus BUS. Over the control-data bus BUS, it is possible not only to enter new control data but also to output various operating parameters, such as the current wiring of the crosspoints in the switching matrix K. An input multiplexer EMUX is interposed between the inlets E1 through E16 and the switching matrix K. Similarly, an output multiplexer AMUX is interposed between the switching matrix K and the outlets A1 through A16. The input multiplexer EMUX and the output multiplexer AMUX are controlled by the decode and control logic 6 over the control-data bus Stb.

The input multiplexer EMUX allows any signal path coming from any of the inlets E1 through E16 to be opened and a test signal TS to be injected into the open signal path. The output multiplexer AMUX permits selective access to any of the 16 signal paths leading to the outlets A1 through A16. No interruption of a signal path in the output multiplexer AMUX is necessary for this purpose.

Figure 1:
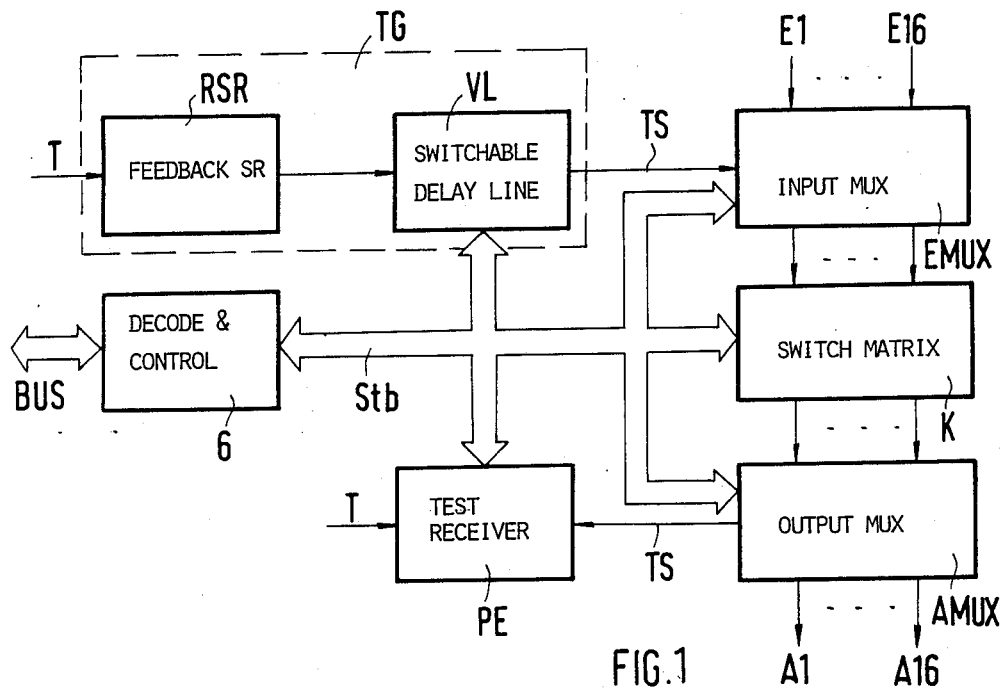
FIG. 1 is a block diagram of a circuit arrangement in accordance with the invention.

The circuit arrangement of FIG. 1 further includes a test-signal generator TG and a test receiver PE. In the test-signal generator TG, the test signal TS is produced as a pseudorandom binary sequence by means of a feedback shift register RSR, and changed in phase by means of a switchable delay line VL. The delay line VL is controlled by the decode and control logic 6 over the control-data bus Stb. To the test-signal generator TG and, thus, the feedback shift register RSR, a system clock T is applied. As the phase of the test signal TS can be selectively changed with respect to the system clock T in the switchable delay line VL, the response of the circuit in the presence of phase-error-containing input signals can be simulated.

The construction details of the test receiver PE is not shown in the drawings; those skilled in the art will be familiar with how a pseudorandom signal generated in a feedback shift register can be detected. A shift register which is wired in the same manner as the feedback shift register RSR but in which the feedback path is open and in which the signal fed back is compared with the input signal fulfills the required function in a simple manner. Even if the test-signal generator TG cycles continuously, and the test signal TS is applied to the test receiver PE at an arbitrary time, the signal at the input of the shift register in the test receiver PE and the signal obtained by feedback will be identical after passage of a bit through the entire shift register at the latest if the shift register is clocked with the system clock T and if the test signal TS reaches the test receiver PE error-free. The test receiver PE may be designed to detect only (after passage of the first bit) whether an error has occurred at all or it may be expanded with counters for setting a given gating time or for counting the errors and with devices for evaluating the errors, e.g., to compile error-distribution statistics. The kinds of measurements to be performed, particularly the desired gating time and the interrogation for measurement results, are set by the decode and control logic 6 over the control-data bus Stb.

The above-described access to a plurality of different signal paths could be replaced by access to different points of one and the same signal paths. Furthermore, in the absence of a system clock that could be used for the testing, a possibly frequency-selectable clock could be generated in the test-signal generator TG. In the test receiver PE, the clock could also be derived from the signal itself in a conventional manner.

Figure 2:
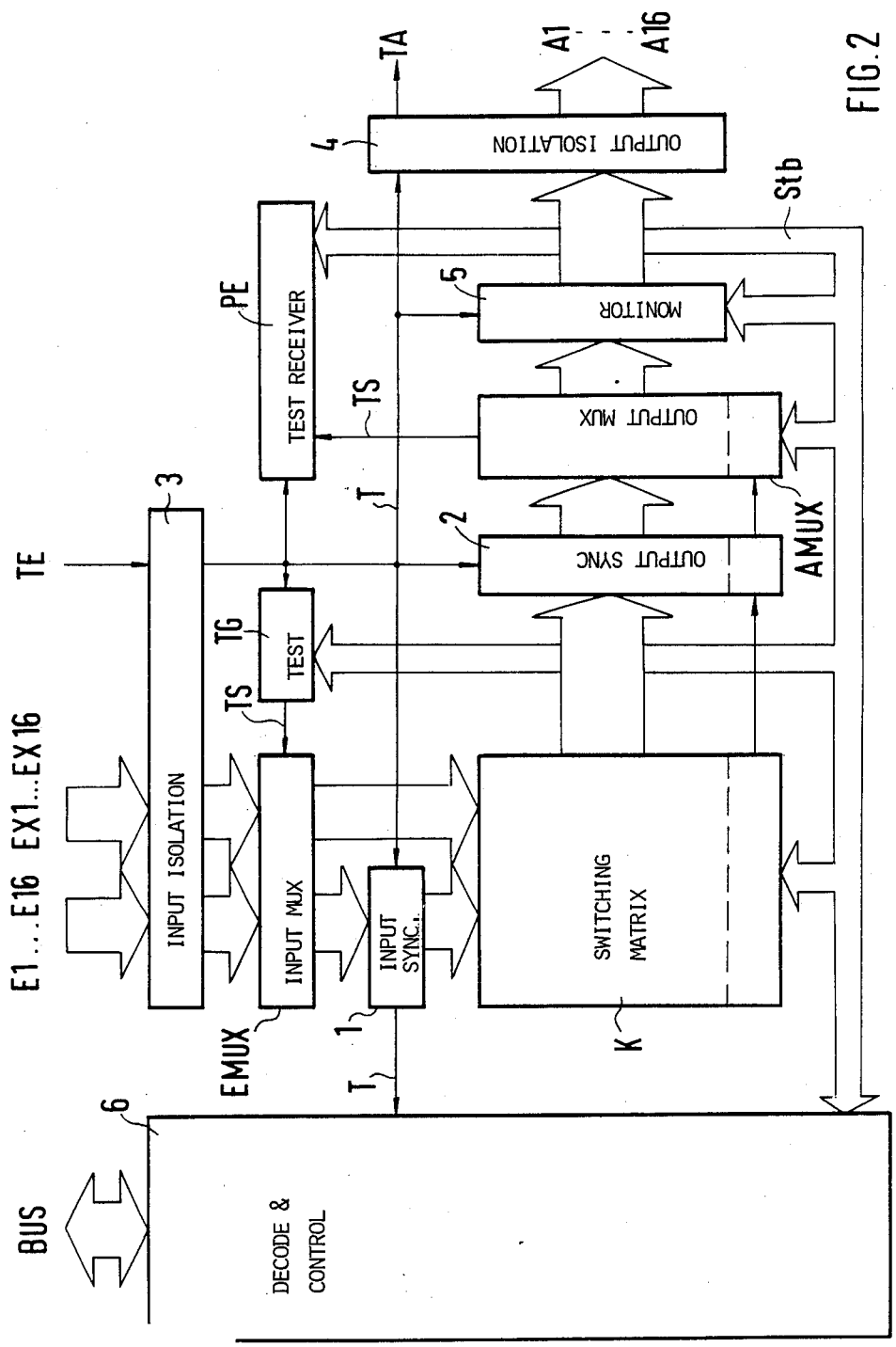
FIG. 2 is a block diagram of a broadband switching module implemented as a circuit arrangement in accordance with the invention.

FIG. 2 shows the complete block diagram of a broadband switching module. This module includes the elements already described with the aid of FIG. 1. It further contains an input synchronizer I, an output synchronizer 2, an input isolation amplifier 3, an output isolation amplifier 4, and a monitoring device 5. Each of the outlets A1 through A16 is assigned an extension inlet EX1 through EX16, whereby a cascade connection of the switching modules becomes possible. The system clock T is applied through a clock input TE and passed on through a clock output TA. The switching matrix K has an additional output which is connected to the output multiplexer AMUX and provides an additional possibility of testing. The switchable delay line VL contained in the test-signal generator TG (see also FIG. 1) permits effective testing of the synchronizers 1 and 2. The monitoring device 5 is designed to determine during operation whether any signal is being transmitted; it does not check the correctness of the signal.

The operation of such a broadband switching module can be tested to a very large extent by simple means without the need for any expensive additional facilities, particularly without the need to apply a large number of high-frequency input signals and to tap a large number of high-frequency output signals. Thus it becomes possible to test such an LSI broadband switching module already on the wafer at a minimal expense which can be readily justified. Although this might also be possible with a testing device as described above with reference to DE-OS 33 31 403, the circuit arrangement according to the invention also makes it possible to perform systemwide tests in a simple manner. This will now be described with the aid of FIG. 3.

Figure 3:
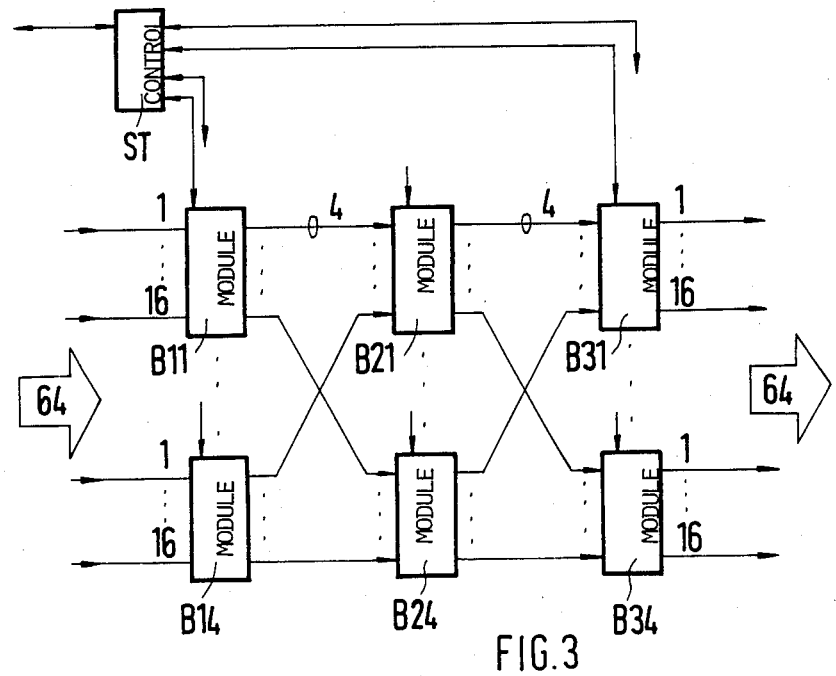
FIG. 3 shows, as an example of a communications network in accordance with the invention, a broadband switching unit constructed from several broadband switching modules as shown in FIG. 2.

FIG. 3 shows a broadband switching unit which is part of a large broadband switching network and is composed of individual broadband switching modules B11 through B34. Such a broadband switching unit has 64 broadband-signal inlets and 64 broadband-signal outlets. Within this unit, a great number of different signal paths are possible. If each of these broadband switching modules B11 through B34 is designed as shown in FIG. 2, i.e., if it includes a test-signal generator TG and a test receiver PE which is independent of this generator, it is possible to apply a test signal to the input of any signal path and to take this test signal from the output of this signal path, usually in another broadband switching module, and test it. It is also possible to test signal paths across several switching units. Even the signal paths to subscribers or to distant exchanges can be tested if either test receivers of the same kind are present there or if it is possible to establish a loop to a signal path in the opposite direction under remote control. Such possibilities will probably be common in future. For example, a connection may be established and tested from any test-signal generator within a broadband switching network to a subscriber's video telephone and from the latter back to any test receiver within the broadband switching network. This only requires—and this requirement is usually already satisfied for other reasons unrelated to the present invention—that the individual broadband switching modules be connected to a central control unit or to interconnected decentralized control units ST.

Thus, various testing possibilities which would otherwise be impractical, particularly in broadband switching networks and broadband switching modules, are provided at relatively low cost.

The present invention has been described above with regard to the certain presently contemplated specific embodiments of the invention. It will be appreciated to those skilled in the ar&: that modifications and variations thereof are possible within the spirit and scope of the appended claims.

What is claimed is:

1. A circuit arrangement comprising:
   at least one signal input terminal,
   at least one signal output terminal,
   signal path means for providing a signal path from a selected said signal input terminal to a selected said signal output terminal,
   said signal path means comprising
   a selecting multiplexer for allowing the signal path to be opened at a predetermined point thereof and a test signal to be injected into a subsequent portion of the signal path between said predetermined point and the selected signal output terminal,
   input and output means for inputting control data to control the selecting multiplexer and for outputting operating parameters,
   a test-signal generator for injecting a test signal through the selecting multiplexer to said subsequent portion,
   an error-detection circuit for checking a received test signal for transmission errors and for providing operating parameters including an indication of any detected errors to said input and output means, and
   test access means for providing said error-detection circuit access to said signal path at least one point of said subsequent portion.

2. A circuit arrangement as claimed in claim 1, wherein
   the test-signal generator comprises phase means responsive to the control input for adjusting the phase of the test signal in relation to a reference signal.

3. A circuit arrangement as claimed in claim 2, wherein the phase means is a switchable delay line.

4. A circuit arrangement as claimed in claim 1 wherein said predetermined point may selectively be one of at least two spaced apart points.

5. A circuit arrangement as claimed in claim 1 wherein said at least one point may selectively be one of at least two spaced apart point.

6. A circuit arrangement as claimed in claim 1 wherein said signal path may selectively be one of at least two distinct signal paths each having an associated said predetermined point.

7. A circuit arrangement as claimed in claim 1 wherein said subsequent portion may selectively be a subsequent portion of a selected one of at least two signal paths.

8. Communications network comprising
a plurality of circuit arrangements as set forth in claim 1 having their respective input and output terminals interconnected in such a manner as to permit at least one signal path to be selected from a selected first said circuit arrangement to a selected second said circuit arrangement, and
a controller connected to the input and output means of each of said circuit arrangements.

9. A method of testing a communications network as claimed in claim 8, comprising the steps
using said controller to cause the test-signal generator of said first circuit arrangement to inject a test signal into a first portion of said test signal path within said first said circuit arrangement, and
using said controller to cause the error-detection circuit of said second said circuit arrangement to check the thus transmitted test signal at a second portion of said signal path within said second said circuit arrangement.

10. The method of claim 9, further comprising the steps selecting the signal path to be tested from the first said circuit arrangement to the second said circuit arrangement from a plurality of possible such signal paths.

* * * * *

UNITED STATES PATENT AND TRADEMARK OFFICE
CERTIFICATE OF CORRECTION

PATENT NO. : 4,881,229
DATED : November 14, 1989
INVENTOR(S) : G. Kaltbeitzel; M. Klein; M. Renner; J. Wolk It is certified that error appears in the above-identified patent and that said Letters Patent is hereby corrected as shown below:

On the Front Page:

[54] Title; change "COMMUNICATION" to -- COMMUNICATIONS --.

In the Specification

Column 1, line 1, change "COMMUNICATION" to -- COMMUNICATIONS --.

Column 3, line 36, change "I," to -- "1" --.

Column 4, line 18, after "in" insert -- the --.
Column 4, line 36, change "ar&:" to -- art --.

In the Claims

Column 5, line 11, change "point" to -- points --.

Column 6, line 16, after "said" insert -- test --.

Signed and Sealed this

Third Day of September, 1991

*Attest:*

HARRY F. MANBECK, JR.

*Attesting Officer*  *Commissioner of Patents and Trademarks*